US008897647B2

(12) United States Patent
Friese et al.

(10) Patent No.: US 8,897,647 B2
(45) Date of Patent: Nov. 25, 2014

(54) METHOD AND COMMUNICATION ARRANGEMENT FOR ESTABLISHING A COMMUNICATION LINK

(75) Inventors: Thomas Friese, München (DE); Georg Von Wichert, München (DE)

(73) Assignee: Siemens Aktiengesellschaft, Munich (DE)

(*) Notice: Subject to any disclaimer, the term of this patent is extended or adjusted under 35 U.S.C. 154(b) by 26 days.

(21) Appl. No.: 13/600,999

(22) Filed: Aug. 31, 2012

(65) Prior Publication Data
US 2013/0058658 A1 Mar. 7, 2013

(30) Foreign Application Priority Data

Sep. 2, 2011 (DE) .......................... 10 2011 082 066

(51) Int. Cl.
*H04B 10/00* (2013.01)
*H04Q 9/00* (2006.01)
*G08C 23/04* (2006.01)
*H04W 84/18* (2009.01)
*H04W 76/02* (2009.01)

(52) U.S. Cl.
CPC .............. *G08C 23/04* (2013.01); *H04W 84/18* (2013.01); *H04Q 9/00* (2013.01); *H04Q 2209/43* (2013.01); *H04W 76/02* (2013.01)
USPC ........... 398/115; 398/128; 398/130; 398/172; 398/118

(58) Field of Classification Search
CPC .. H04B 10/11; H04B 10/114; H04B 10/1143; H04B 10/112; H04B 10/118; H04B 10/2575; H04B 10/40; H04B 10/2573; H04B 10/43
USPC ......... 398/115, 128, 130, 131, 127, 118, 135, 398/116, 117, 172, 140, 136, 137, 138, 139, 398/162
See application file for complete search history.

(56) References Cited

U.S. PATENT DOCUMENTS

| 7,450,854 B2* | 11/2008 | Lee et al. ...................... 398/115 |
| 7,715,723 B2* | 5/2010 | Kagawa et al. ............... 398/131 |
| 2008/0116278 A1 | 5/2008 | Epshteyn |
| 2011/0101086 A1 | 5/2011 | Yach |

FOREIGN PATENT DOCUMENTS

| CN | 201114285 Y | 9/2008 |
| DE | 102005049811 A1 | 4/2007 |
| EP | 0975140 A1 | 1/2000 |
| GB | 2435155 A | 8/2007 |
| GB | 2471567 A | 1/2011 |
| WO | WO-00/75893 A1 | 12/2000 |

OTHER PUBLICATIONS

German Examination Report dated Nov. 21, 2013 for corresponding German Application No. 102011082066.3.

* cited by examiner

*Primary Examiner* — Hanh Phan
(74) *Attorney, Agent, or Firm* — Harness, Dickey & Pierce, P.L.C.

(57) ABSTRACT

A communication link can be established by way of a radio interface between a first mobile communication facility and a second mobile or permanently stationary communication facility. In at least one embodiment, an item of identification information is made available by one of the communication facilities as an optical signal for receipt at the cited sensor; the communication facility, to which the sensor receiving the optical signal belongs, accepts the identification information and transfers the accepted identification information as a request to set up a communication link via the radio interface with the communication facility, which makes or has made the optical signal available. The requested communication facility implements a comparison between the accepted identification information and its own identification information and permits the setup of the communication link as a function of the comparison result.

27 Claims, 1 Drawing Sheet

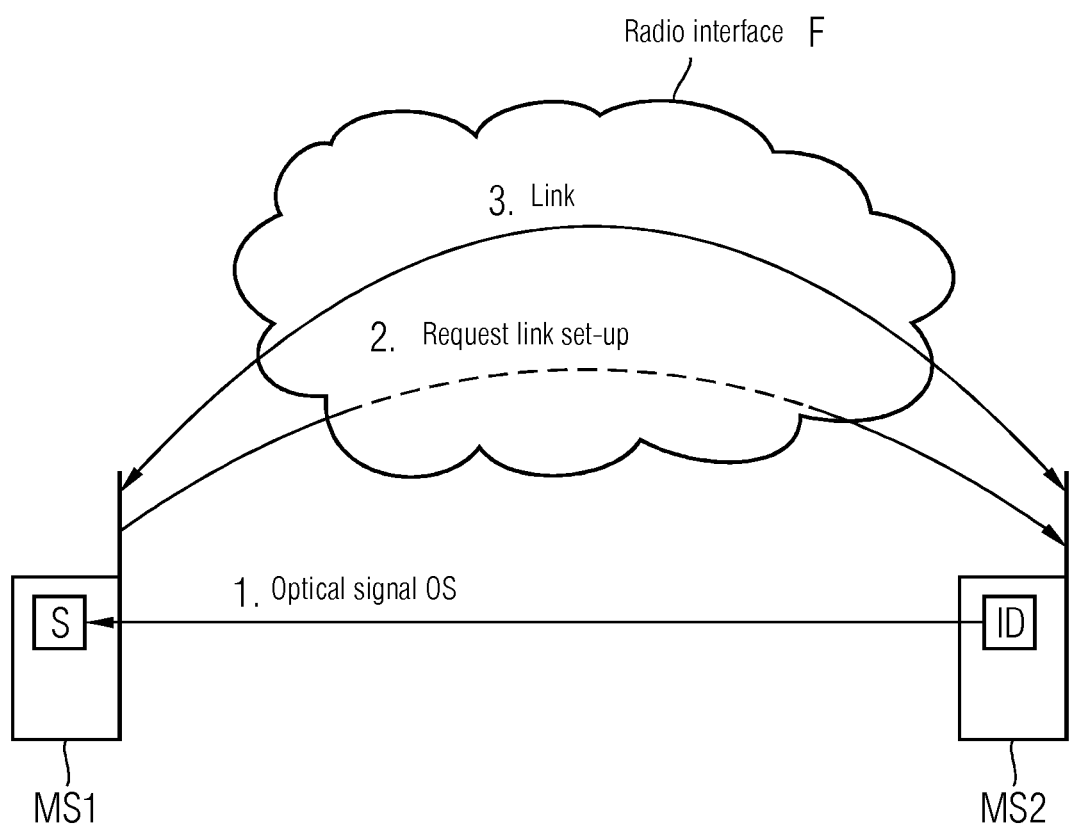

METHOD AND COMMUNICATION ARRANGEMENT FOR ESTABLISHING A COMMUNICATION LINK

PRIORITY STATEMENT

The present application hereby claims priority under 35 U.S.C. §119 to German patent application number DE 102011082066.3 filed Sep. 2, 2011, the entire contents of which are hereby incorporated herein by reference.

FIELD

The invention generally relates to a method for establishing a communication link, a communication arrangement for implementing the method and/or associated communication facilities and/or computer program products.

BACKGROUND

It is often desired that a mobile communication facility and/or a mobile station can communicate with at least one further communication facility. By way of example, physicians in a medical environment want to exchange patient data stored on their communication facilities, e.g. mobile telephones, so-called smartphones, PDAs, tablet PCs etc. with other colleagues' communication facilities. It is possible for a mobile station which communicates with a cellular mobile radio network or a wireless local (adhoc) network, to operate approximately according to the GSM (Global Standard for Mobile Communications) or UMTS (Universal Mobile Telecommunications Standard), LTE (Long Term Evolution), DECT (Digital Enhanced Cordless Telecommunications), Bluetooth, WIFI standard or other mobile or wireless standards.

If a user would like to transmit data from his/her own communication facility to a further communication facility or would like to actuate an extended control action by way of a wireless link, he/she must firstly identify the partner communication facility. Since a large number of devices are often found in the range of his/her communication facility, with which a link could be set up by way of Bluetooth for instance, in a select list of the communication facilities to be reached, it is difficult to accurately identify the communication facility with which the user would like to exchange data.

SUMMARY

At least one embodiment of the invention creates a simple and cost-effective possibility, by which a mobile communication facility can establish a communication link with a further communication facility by way of at least one radio interface.

Advantageous developments form the subject matter of the dependent claims.

In accordance with at least one embodiment of the invention, a communication link can be established between a first mobile communication facility and a second mobile or permanently stationary communication facility by way of a radio interface, wherein the distance between the two communication facilities lies in a range in which a sensor associated with at least one of the two communication facilities can receive optical signals.

BRIEF DESCRIPTION OF THE DRAWINGS

Further advantages, details and developments of the invention result from the subsequent description of exemplary embodiments in conjunction with the drawings, in which:

The FIGURE shows a schematic inventive procedure.

It should be noted that the FIGURE is intended to illustrate the general characteristics of methods, structure and/or materials utilized in certain example embodiments and to supplement the written description provided below. The drawing is not, however, to scale and may not precisely reflect the precise structural or performance characteristics of any given embodiment, and should not be interpreted as defining or limiting the range of values or properties encompassed by example embodiments.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In accordance with at least one embodiment of the invention, a communication link can be established between a first mobile communication facility and a second mobile or permanently stationary communication facility by way of a radio interface, wherein the distance between the two communication facilities lies in a range in which a sensor associated with at least one of the two communication facilities can receive optical signals.

In this way,

Identification information from one of the communication facilities is made available as an optical signal for receipt at the cited sensor, Wherein the communication facility, to which the sensor receiving the optical signal belongs, accepts the identification information, and The accepted identification information is transferred to the communication facility, which makes or has made available the optical signal, as a request to establish a communication link via the radio interface, The requested communication facility implements a comparison between the accepted identification information and its own identification information and permits the setup of the communication link as a function of the comparison result.

In this way the sensor can be attached to the communication facility or integrated in the communication facility. The sensor can also be arranged such that it can be controlled remotely, such as is possible for instance via Bluetooth. A camera or infrared receiver is conceivable for instance. The optical signal may herewith be visible or invisible (e.g. infrared). The identification information may be a camera image, a barcode, a QR (Quick Response) code, an infrared ID or also position data of the communication facility, which can be determined for instance by means of a GPS receiver, a gyroscope and if applicable a speed sensor.

The identification information can be visible on a display apparatus, e.g. display of the one communication facility and recorded with the camera of the other communication facility. The identification information can also not be shown visibly. For instance, an infrared code is conceivable. It is also possible for the item of identification information to be displayed on the display in a frame within a cycle of an image repetition frequency. The camera and/or the sensor should be adjusted to this image refresh rate and/or this frame.

A further aspect of at least one embodiment of the invention is an arrangement for establishing a communication link and associated communication facilities, which comprise means and/or modules for implementing the afore-cited method, which may be developed in a hardware and/or software related manner and/or as computer program product respectively.

The arrangement and the (mobile) communication facilities and computer program product can be developed accordingly like the method.

At least one embodiment of the invention can be used to exchange data in a medical environment.

At least one embodiment of the invention comprises at least one of the following advantages:

The user can easily establish a communication link with his/her communication facility with a communication facility located in the range, without undergoing several failed attempts to establish a link.

The identification information, which, as an optical signal, can be transmitted, increases the security to such a degree that a link is set up with the addressed communication facility and not inadvertently with another communication facility. Furthermore, unauthorized access from "outside" can be prevented.

Terms used should at first be clarified prior to a detailed representation of the Figures.

A communication arrangement is a structure for exchanging data.

This communication arrangement can also contain one or several radio networks, which operate with different transmission standards. A mobile radio network according to the GSM or UMTS standard or also a DAB network can be considered as a radio network.

This may be for instance a cellular mobile radio network, such as for instance the GSM network (Global System of Mobile Communications) or the UMTS network (Universal Mobile Telecommunications System). A radio network includes at least two connecting nodes, so-called "point-to-point" links therefore also fall under this term.

A cellular radio network includes stationary base stations, by way of which mobile terminals and/or mobile stations connect with one another by way of a radio interface. By way of example the radio transmission network comprises at least base stations in UMTS.

A base station is a central unit in a radio network, which, in the event of a cellular mobile radio network, operates terminals or communication facilities within a cell of the mobile radio network by way of one or several radio channels. The base station provides the wireless interface between the base station and terminal. It adopts the handling of the radio operation with the mobile subscribers and monitors the physical radio link.

A mobile station can be any communication terminal or terminal by way of which the user communicates in a communication system. This includes for instance mobile radio terminals such as mobile telephones, PDAs or portable computers and/or tablet PCs with a radio module. A mobile station is also referred to as "user equipment" in UMTS. The mobile station may comprise more than one or also more than two transmit/receive units.

By way of example, physicians in a medical environment want to exchange patient data stored on their communication facilities, for instance mobile telephones, so-called smartphones, PDAs, tablet PCs etc, with other colleagues' communication facilities.

The following scenario is herewith conceivable for instance according to the FIGURE.

The FIGURE shows the following possible constellations:

A mobile station MS1 should establish a communication link with a mobile station MS2. To this end, the mobile station MS2 indicates identification information, e.g. on the display of the mobile station, which is transmitted as an optically visible and/or invisible signal OS to a sensor S of the mobile station MS1. This can take place for instance such that identification information is shown on the display of the mobile station MS2 and is recorded with an optical sensor, e.g. a camera of the mobile station MS1. The mobile station MS1 thereupon transmits a request for a link to be set up with the mobile station MS2 by way of a radio interface F, as is described for instance in detail above. The request to establish a link herewith contains the identification information received by way of the optical sensor. The mobile station MS2 compares the identification information received by way of the request with its own item of identification information, which it previously displayed on a display for instance. If by comparison the two items of identification information do not correspond, the mobile station MS2 allows the link to be set up which was requested by the mobile station MS1. The link between the mobile station MS1 and MS2 is therefore established.

The following developments of at least one embodiment of the invention are conceivable:

An integrated camera of a mobile communication facility, e.g. MS1 and/or a visual identification aid is used. The communication facility, to which a link is to be set up, e.g. MS2, indicates an identification code or information on its display.

Here the information and/or the identification information can reach another communication facility, to which a link is to be set up, as follows:

1. A complete camera image is transmitted to the communication facility by way of the cited connection setup request, at which a link is to be established. Or, the camera image is transmitted via a radio interface, e.g. F, in the so-called Broadcast method, i.e. several base stations contain the camera image and transmit the same accordingly further. It is herewith also conceivable for a link to be set up with a predetermined base station, in which the comparison of the identification information takes place and which in accordance with the comparison result, forwards the image information via a data bus. A further embodiment provides for a cutout of the afore-cited camera image to be transmitted via the afore-displayed transmission paths.
2. A further embodiment of the invention provides that a special and easily identifiable identification code and/or identification information, e.g. a barcode or a Quick Response Code (QR code) is used on the display of a communication facility, which is displayed on the display in a frame of an image refresh cycle (e.g. if the display repeats its frame at a frequency of one frame per second). In other words, at a frequency of 60 Hz for instance such identification information can be displayed during image setup every 60th frame. This is generally not visible on the monitor to the human eye. The communication facility identifying the item of identification information and/or the QR code has a sensor here, which can trigger the image refresh rate and identifies the identification information. The communication facility then allows a comparison algorithm to run and sets up a link with the other communication facility during identification.
3. In a further embodiment of the invention, a direct optical signal, e.g. an infrared signal is transmitted from one communication facility to the next communication facility. This signal is generally invisible to the human eye. An infrared-transmitting facility may therefore also be controlled by a communication facility with the aid of a Bluetooth interface. The communication facility receiving the identification code in turn transmits a link setup request to the other communication facility, which compares the identification code received by way of the request with its own identification code and accordingly permits a link.
4. A further embodiment of the invention ensures that precise position data of the communication facility is determined in order to identify a communication facility. To this end, a GPS receiver or a gyroscope or even an accelerometer can be used herefor. This position data can then be used as identification information. The communication facility receiving the position data implements in turn a comparison with its own position data and allows a link to be established as a function of the comparison result.

The invention is not restricted to the afore-cited example embodiment. It is also conceivable, as shown in the FIGURE, for the mobile station MS1 to firstly send a link setup request to the mobile station MS2. Identification information is contained in this request. The mobile station MS2 thereupon indicates this identification information on the display for instance. The mobile station MS1 identifies, by way of an optical signal and its sensor, the identification information indicated on the mobile station MS2 and compares this with the identification information which it has sent in the link setup request. The mobile station MS1 then allows the link to be set up as function of the comparison result.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magnetooptical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for establishing a communication link via a radio interface between a first communication facility and a second communication facility, wherein a distance between the first and second communication facilities lies in a range in which optical signals are receivable by a sensor associated with at least one of the first and second communication facility, the method comprising:
    accepting, at the first communication facility, identification information from the second communication facility, the identification information being transmitted to the first communication facility via an optical signal;
    transferring the accepted identification information to the second communication facility via the radio interface, as a request to set up the communication link; and
    establishing the communication link if the second communication facility determines that the transferred identification information received from the first communication facility matches the identification information transmitted to the first communication facility by the second communication facility via the optical signal.

2. The method of claim 1, wherein the sensor is attached to or embedded within the first communication facility and is controllable directly or remotely.

3. The method of claim 1, wherein the optical signal is made available visibly or invisibly.

4. The method of claim 1, wherein the identification information is shown visibly on a display apparatus of the first communication facility.

5. The method of claim 1, wherein the identification information is made available by way of an infrared interface.

6. The method of claim 1, wherein the identification information is made available in at least one frame of a cycle within the scope of an image refresh rate on a display device.

7. The method of claim 1, wherein the identification information is represented by at least one of a camera image, a QR code, a barcode and position data.

8. The method of claim 1, wherein the method is useable in the medical environment.

9. A non-transitory computer readable medium including program segments for, when executed on a computer device, causing the computer device to implement the method of claim 1.

10. A communication arrangement comprising:
    a first communication facility configured to transmit identification information via an optical signal; and
    a second communication facility configured to,
        accept the transmitted identification information,
        transfer the accepted identification information, through a radio interface, to the first communication facility for establishing a communication link via the radio interface between the first communication facility and the second communication facility, and
        establish the communication link via the radio interface if the first communication facility determines that the transferred identification information received from the second communication facility matches the identification information transmitted to the second communication facility by the first communication facility via the optical signal, wherein
    a distance between the first and second communication facilities is in a range in which optical signals are receivable by a sensor of the second communication facility.

11. The arrangement of claim 10, wherein the sensor is attached to or embedded within the first communication facility and is controllable directly or remotely.

12. The arrangement of claim 10, wherein the optical signal is visible or invisible.

13. The arrangement of claim 10, wherein the identification information is displayable visibly on a display apparatus.

14. The arrangement of claim 10, wherein the identification information is made available by way of an infrared interface.

15. The arrangement of claim 10, wherein the identification information is made available on a display apparatus in at least one frame of a cycle within the scope of an image re-fresh rate.

16. The arrangement of claim 10, wherein the identification information is representable by at least one of a camera image, a QR code, a barcode and position data.

17. The arrangement of claim 10, wherein the arrangement is usable in the medical environment.

18. A communication facility, comprising:
    a processor configured to,
        provide identification information via an optical signal for reception at a sensor of another communication facility,
        receive, through a radio interface, a signal from the other communication facility for establishing a communication link between the communication facility and the other communication facility via the radio interface, the signal including the identification information as received by the other communication facility,
        compare the received identification information with the identification information provided to other communication facility via the optical signal, and
        establish the communication link if the communication facility determines that the received identification information matches the identification information provided to the other communication facility via the optical signal.

19. A communication facility, comprising:
    a processor configured to,
        accept identification information transmitted by another communication facility via an optical signal,
        transfer the accepted identification information through a radio interface to the other communication facility, as a request to set up a communication link between the communication facility and the other communication facility via the radio interface, and
        establish the communication link if the other communication facility determines that the transferred identification information received from the communication facility matches the identification information transmitted to the communication facility by the other communication facility via the optical signal.

20. A method for establishing a communication link via a radio interface between a first communication facility and a second communication facility, wherein a distance between the first and second communication facilities lies in a range in which optical signals are receivable by a sensor associated with one of the first and second communication facility, the method comprising:
provinding, by the first communication facility, identification information to the second communication facility via an optical signal;
receiving, through a radio interface, a signal from the second communication facility for establishing the communication link, the signal including the identification information as received by the second communication facility;
implementing, at the first communication facility, a comparison between the received identification information and the identification information provided to the second communication facility via the optical signal;
permitting setup of the communication link if the comparison indicates that the received identification information matches the identification information provided to the second communication facility via the optical signal.

21. The method of claim 20, wherein the optical signal is made available visibly or invisibly.

22. The method of claim 20, wherein the identification information is shown visibly on a display apparatus.

23. The method of claim 20, wherein the identification information is made available by way of an infrared interface.

24. The method of claim 20, wherein the identification information is made available in at least one frame of a cycle within the scope of an image refresh rate on a display device.

25. The method of claim 20, wherein the identification information is represented by at least one of a camera image, a QR code, a barcode and position data.

26. The method of claim 20, wherein the method is useable in the medical environment.

27. A non-transitory computer readable medium including program segments for, when executed on a computer device, causing the computer device to implement the method of claim 20.

* * * * *